(12) United States Patent  (10) Patent No.: US 9,047,359 B2
Caballero et al.  (45) Date of Patent: Jun. 2, 2015

(54) APPARATUS AND METHODS FOR MONITORING ONE OR MORE PORTABLE DATA TERMINALS

(75) Inventors: Aldo M. Caballero, Charlote, NC (US); Daniel Brant French, Charlotte, NC (US); Douglas M. Hinson, Monroe, NC (US); James C. Kosecki, Syracuse, NY (US); David Mangicaro, Syracuse, NY (US); Scott Reynolds, Concord, NC (US); Daniel Duane Yeakley, Monroe, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1185 days.

(21) Appl. No.: 11/669,987

(22) Filed: Feb. 1, 2007

(65) Prior Publication Data

US 2008/0185432 A1  Aug. 7, 2008

(51) Int. Cl.
*G06K 7/00* (2006.01)
*G06F 11/30* (2006.01)
*G06F 11/07* (2006.01)

(52) U.S. Cl.
CPC ........ *G06F 11/3058* (2013.01); *G06F 11/0742* (2013.01); *G06F 11/3013* (2013.01); *G06F 11/3093* (2013.01); *G06F 11/0766* (2013.01)

(58) Field of Classification Search
CPC ...... G06K 7/0095; G06K 7/0013; G06K 7/10
USPC .......... 235/435, 438, 462.43, 462.45, 462.46; 702/33–35, 127, 187
See application file for complete search history.

(56) References Cited

U.S. PATENT DOCUMENTS

| | | | | |
|---|---|---|---|---|
| 5,334,826 A * | 8/1994 | Sato et al. | ............... | 235/462.06 |
| 5,541,985 A * | 7/1996 | Ishii et al. | ..................... | 379/111 |
| 5,654,534 A * | 8/1997 | Coleman | .................. | 235/462.06 |
| 5,682,328 A * | 10/1997 | Roeber et al. | ................. | 702/187 |
| 5,892,210 A * | 4/1999 | Levasseur | ...................... | 235/380 |
| 5,919,258 A * | 7/1999 | Kayashima et al. | ............ | 726/23 |
| 5,992,751 A * | 11/1999 | Laser | ........................ | 235/472.01 |
| 6,186,400 B1 * | 2/2001 | Dvorkis et al. | .......... | 235/462.45 |
| 6,264,106 B1 * | 7/2001 | Bridgelall | ................ | 235/462.46 |
| 6,296,187 B1 * | 10/2001 | Shearer | ..................... | 235/462.41 |
| 6,453,266 B1 * | 9/2002 | Chainer et al. | ................ | 702/184 |
| 6,490,434 B1 * | 12/2002 | Grundvig et al. | .......... | 455/67.11 |
| 6,626,361 B2 * | 9/2003 | Hileman | .................. | 235/462.01 |
| 6,672,512 B2 * | 1/2004 | Bridgelall | ................ | 235/462.46 |
| 6,782,345 B1 * | 8/2004 | Siegel et al. | .................. | 702/183 |
| 6,789,030 B1 * | 9/2004 | Coyle et al. | ..................... | 702/77 |
| 6,970,804 B2 * | 11/2005 | Siegel et al. | .................. | 702/182 |
| 7,015,817 B2 * | 3/2006 | Copley et al. | .............. | 340/573.4 |
| 7,133,805 B1 * | 11/2006 | Dankenbring et al. | ........ | 702/186 |
| 7,174,264 B2 * | 2/2007 | Yasukawa et al. | ............ | 702/115 |
| 7,275,009 B2 * | 9/2007 | Yasukawa et al. | ............ | 702/115 |
| 7,278,060 B2 * | 10/2007 | Jeddeloh | ......................... | 714/42 |
| 7,308,385 B2 * | 12/2007 | Wegerich et al. | ............. | 702/183 |

(Continued)

*Primary Examiner* — Paultep Savusdiphol
(74) *Attorney, Agent, or Firm* — Additon, Higgins & Pendleton, P.A.

(57) ABSTRACT

A portable data terminal generally includes a housing supporting: a data collection device; a keypad; and a touch screen. One or more PDTs are provided with a monitoring system that records occurrences experienced by the portable data terminal. The record of occurrences may be analyzed to identify errors and/or failure prone parts of the PDT along with behaviors likely to lead to errors or failures. Additionally, the record of events may be analyzed to predict errors and/or failures for any given PDT.

20 Claims, 7 Drawing Sheets

(56) References Cited

U.S. PATENT DOCUMENTS

| | | | |
|---|---|---|---|
| 7,321,766 B2* | 1/2008 | Liu et al. | 455/425 |
| 7,346,807 B1* | 3/2008 | Burbidge et al. | 714/25 |
| 7,509,116 B2* | 3/2009 | Fan et al. | 455/405 |
| 7,522,050 B2* | 4/2009 | Le | 340/572.1 |
| 7,617,979 B2* | 11/2009 | Crooks | 235/451 |
| 2001/0010052 A1* | 7/2001 | Sakamoto et al. | 709/100 |
| 2002/0032875 A1* | 3/2002 | Kashani | 713/300 |
| 2004/0017300 A1* | 1/2004 | Kotzin et al. | 340/870.11 |
| 2004/0117153 A1* | 6/2004 | Siegel et al. | 702/183 |
| 2005/0050423 A1* | 3/2005 | Yasukawa et al. | 714/742 |
| 2005/0082371 A1* | 4/2005 | Schmidt et al. | 235/462.45 |
| 2005/0121523 A1* | 6/2005 | Schmidt et al. | 235/462.46 |
| 2007/0063048 A1* | 3/2007 | Havens et al. | 235/462.46 |
| 2007/0145147 A1* | 6/2007 | Schmidt et al. | 235/462.46 |
| 2007/0255517 A1* | 11/2007 | Boerstler et al. | 702/79 |
| 2008/0157924 A1* | 7/2008 | Batra | 340/10.1 |

* cited by examiner

APPARATUS AND METHODS FOR MONITORING ONE OR MORE PORTABLE DATA TERMINALS

BACKGROUND OF THE INVENTION

The term Portable data terminal (PDT) refers to data collection devices used to collect, process, and transfer data to a larger data processing system. Most PDTs are ruggedized to some extent for use in industrial environments. The tougher the environment, the more robust the PDT. PDT's are available from several sources, including the assignee of the present application: HAND HELD PRODUCTS, INC.

A PDT generally comprises a mobile computer, a keypad, and a data acquisition device. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

Figure 1A:
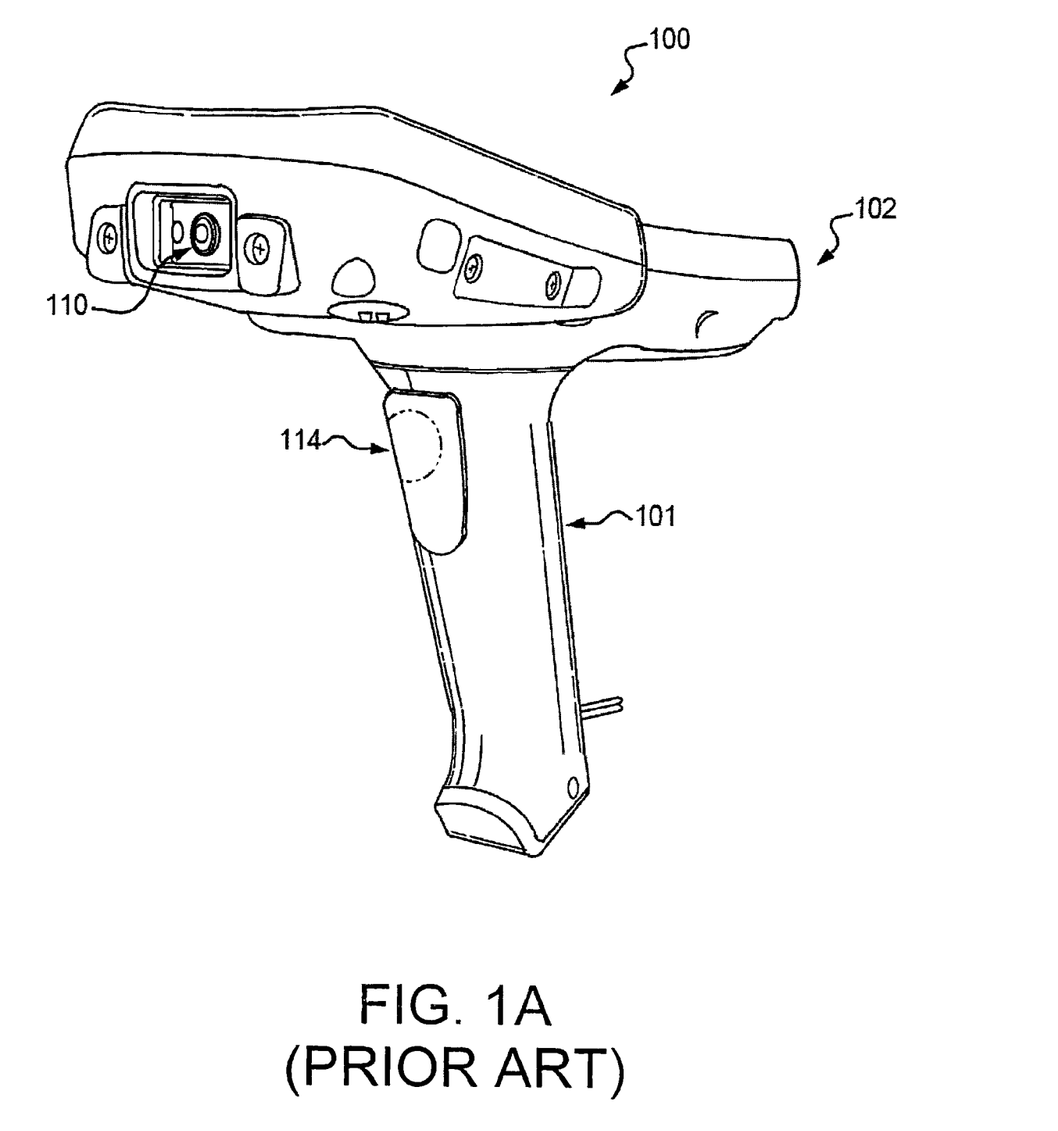
FIG. 1A is an orthogonal view of a known PDT.
Figure 1B:
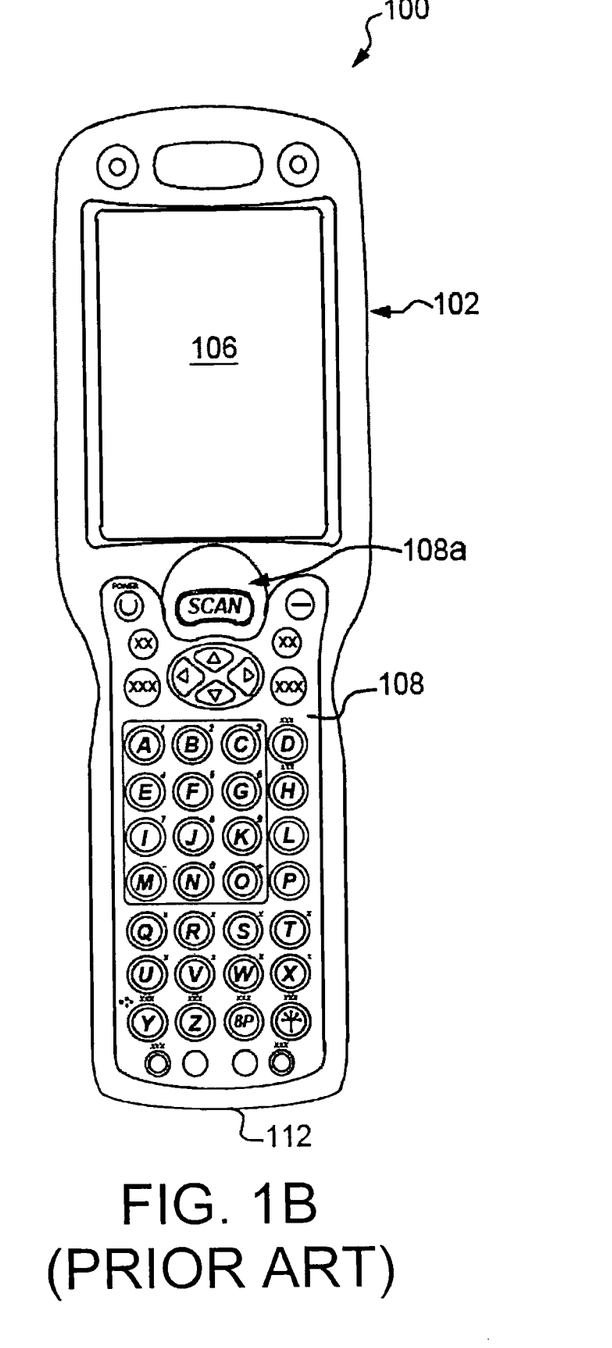
FIG. 1B is a plan view of a known PDT.

FIG. 1A is an orthogonal view of a known PDT 100. FIG. 1B is a plan view of the known PDT 100. The illustrated example utilizes a popular form factor incorporating a body 102 and a handle 101. The body 102 generally supports a variety of components, including: a battery (not shown but typically located on the rear half of the body); an LCD with touch screen 106; a keyboard 108 (including a scan button 108a); a scan engine 110; and a data/charging port 112 (not fully illustrated). The scan engine 110 may comprise, for example, an image engine or a laser engine. The data/charging port 112 typically comprises a proprietary interface with one set of pins or pads for the transmitting and receiving of data and a second set of pins or pads for receiving power for powering the system and/or charging the battery.

The handle 101, extending from a bottom surface of the body 102, incorporates a trigger 114. In use, the user may actuate either the scan key 108a or the trigger 114 to initiate a frame capture via the image engine 110. The captured frame may either be processed as an image or as a data carrier. In the first case, the captured frame may undergo some post capture image processing, such as de-speckling or sharpening and then stored as an image file (e.g. a bitmap, jpeg of gif file) and possibly displayed. In the second case the captured frame also undergoes some post capture image processing but the image is then analyzed, e.g. decoded, to identify data represented therein. The decoded data is stored and possibly displayed on the PDT 100. Additional processing of the image or data may take place on the PDT 100 and/or a data processing resource to which the data is transmitted via any available transport mechanism on the PDT 100. Some examples of known transport mechanisms utilized by PDT's include: Bluetooth, WiFi, GSM, CDMA, USB, IrDA, removable FLASH memory, parallel and serial ports (including for example, RS-232).

PDTs, such as PDT 100, are quite complex devices that, in addition to having many of the same failure modes as PCs and Laptops, have many unique failure modes. Some of these failure modes stem from the fact that PDTs are generally utilized in harsher environments and for longer durations than PCs and Laptops. For example, one popular use of PDT is by package delivery companies as a tool to track packages. PDT's used in such tasks may be roughly treated by the package delivery personnel and may be subjected to unusual environmental factors, such as being left on the dash of a delivery van in the hot Texas sun, while the driver eats his or her lunch. It is also known that some users of PDT intentionally inflict damage to the PDT in an attempt to prevent their employers from monitoring their job performance via the data collected by the PDT. Trying to predict the type of abuse directed at a PDT is one important aspect of designing the PDT.

Most of the information regarding the manner of use and the environment of such use is obtained by studying PDTs returned for repair work and interrogating the party submitting the PDTs for repair. It is understandable that some parties may not be fully forthcoming regarding their activities. Further, many PDTs are simply submitted for repair with little or no indication of what failure a user is experiencing or what activity preceded the failure.

Accordingly, the present Inventors have recognized a need for apparatus and methods to monitor one or more PDTs and make a record of the actions and forces acting upon the PDT.

BRIEF DESCRIPTION OF THE DRAWINGS

An understanding of the present invention can be gained from the following detailed description of embodiments of the invention, taken in conjunction with the accompanying drawings of which.

DETAILED DESCRIPTION

Reference will now be made in detail to the present invention, examples of which are illustrated in the accompanying drawings, wherein like reference numerals refer to like elements throughout. The following description will use nomenclature associated with an imager based PDT, however those of ordinary skill in the art will recognize that the present invention is applicable to a variety of portable devices including RF or magstripe based PDTs, personal data assistants (PDAs); bar code scanners, and consumer electronics, for example digital cameras, cellular phones, and the like. It is anticipated that many such portable devices would benefit from the present invention, including the embodiments thereof described herein.

A method is here, and generally, conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the invention or the described embodiments to the recited configurations.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a processor or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements—the meaning of which is to be drawn from the context of such use.

Figure 2:
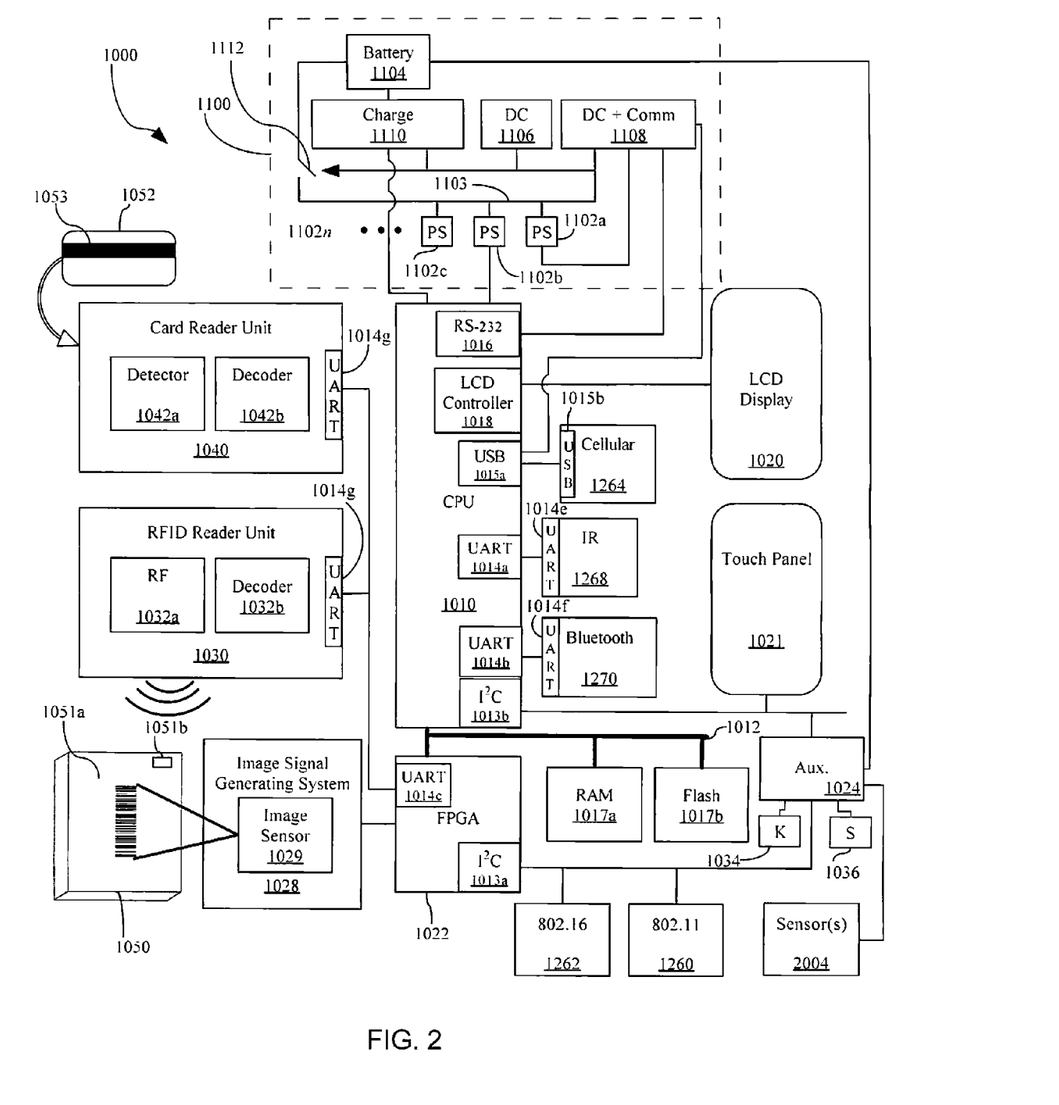
FIG. 2 is a block diagram of a PDT in accordance with an embodiment of the present invention.

FIG. 2 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b. Examples of suitable operating systems for PDT 1000 include: WINDOWS MOBIL, WINDOWS CE, WINDOWS XP, LINUX, PALM, SYMBIAN, and OSX.

In general, communication to and from the CPU 1010 and the various sub-components takes place via one or more ports or busses, including a main system bus 1012; I²C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I²C bus 1013b, may be associated with the LCD 1020 for receipt of data thereon. The combination of the LCD 1020 and the touch sensitive panel 1021 is often referred to as a "touch screen."

A variety of secondary (or "sub") processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family available from XILINX. The auxiliary processor 1024 may comprise any number of embedded (or general purpose) processors, including the PICmicro® family of microcontrollers available from MICROCHIP TECHNOLOGY.

The auxiliary processor 1024 may interface with and control a variety of data input devices including, for example, the touch panel 1021, a keyboard 1034 and a scan button 1036. By way of example, the PDT 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017n. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017n. Decoding may be performed by the CPU 1010 or any suitable secondary processor. Examples of devices suitable for use as the imaging assembly 1028 include an IMAGETEAM 5x00VGA/5x00MPX imaging module of the type available from Hand Held Products, assignee of the present application. A variety of alternatives, including dedicated laser barcode scanners may also be utilized.

One use of the image signal generating system 1028 is for reading and interpreting bar codes such as bar code 1051a on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017n, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted fame. Otherwise there is a danger that the frame the user views when deciding to initiate capture is outdated and does not accurately reflect what the image signal generating system 1028 is currently outputting (and what will be captured in final capture stage).

The RFID reader unit 1030 includes an RF oscillation and receiver circuit 1032a and a data decode processing circuit 1032b. RFID reader unit 1030 may be configured to read RF encoded data from a passive RFID tag, such as tag 1051b, which may be disposed on article 1050.

Where the RFID reader unit 1032a is configured to read RF encoded data from a passive RFID tag, the RF oscillation and receiver circuit 1032a transmits a carrier signal to the passive tag which in turn converts the carrier energy to voltage form and actuates a transponder (not shown) to transmit a radio signal representing the encoded tag data. The RF oscillator and receiver circuit 1032a, in turn, receives the radio signal from the tag and converts the data into a digital format. The data decode processing circuit 1032b, typically including a low cost microcontroller IC chip, decodes the received radio signal information received by RF oscillator and receiver circuit 1032a to decode the encoded identification data originally encoded into RFID tag.

RFID reader unit 1030 may, for example, operate in a selective activation mode or in a continuous read operating mode. In a selective activation mode, RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with the unit automatically, without module 1030 receiving a trigger signal. PDT 1000 may be configured so that the CPU 1010 recognizes a trigger signal under numerous conditions, such as: (1) the trigger 1034 is actuated; (2) an RFID trigger instruction is received from a remote device; or (3) the CPU 1010 determines that a predetermined condition has been satisfied.

Still further, the PDT 1000 may include a card reader unit 1040 for reading data from a card 1052. Card reader unit 1040 generally comprises a signal detection circuit 1042a and a data decode circuit 1042b. In operation, the signal detection circuit 1042a detects data from, for example, a magnetic strip 1053 on a card 1052. Subsequently, the data decode circuit 1042b decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 supplies power to the PDT 1000. The power circuit 1100 generally comprises a series of power supplies 1102n that regulate the power supplied to the various components of the PDT 1000. The power supplies 1102n each generally comprise step up or step down circuits which are in turn connected to each of the various components in the PDT 1000 that require the particular voltage output by that power supply 1102n.

The power supplies receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies, such as the D Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths, e.g. RS-232 and USB. It may also prove advantageous to provide DC power out, for example from a power supply 1102a, so as to power tethered accessories, such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including fuel cell, NiMh, NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1016 which may modify the charging behavior of the charge circuit 1110 based on information generated by the auxiliary processor 1024. In this example the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to the power input 1106 or the second power input on the connector 1108, the battery is isolated from the power supplies 1102n and may be charged via the charge circuit 1110. Once power is removed from the power input 1106 and the connector 1108, the battery is connected to the power supplies 1102n.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

The PDT 1000 is provided with a set of instructions (which may exist in a variety of forms, for example: as software, as firmware, or hard coded) that monitors the PDT 1000 and creates records indicative of occurrences related to the operation and use of the PDT 1000. This set of instructions will be referred to herein as the monitoring software.

Most known CPUs suitable for use in a PDT, such as the PDT 1000, have one or more power save states, often referred to as steep states. Such states conserve battery power by shutting down certain functionalities of the CPU. In general these functions may be "woken" upon the application of a signal to a predefined pin—the signal usually being generated in response to an interrupt. As it may be desirable to monitor certain occurrences regardless of the state of the CPU 1010—including the state of the CPU 1010 itself—it may probe beneficial to execute the monitoring software on a processor other than the CPU 1010.

Thus, in some embodiments of the present invention, the monitoring software or at least a portion thereof, resides on an auxiliary processor, such as the auxiliary processor 1024. The auxiliary processor 1024 may be provided with an instruction set that enables the identification of occurrences. As used herein the term "occurrence" generally means any measurable or countable condition associated with the PDT 1000. The set of instruction preferably includes routines for memorializing each identified occurrence in a data structure referred to herein as a "monitored event." Monitored events can also be based upon a collection or pattern of occurrences. Occurrences may be thought of as being divided into two classes: software occurrences and physical occurrences.

Software occurrences describe countable or measurable occurrences associated with the operation of software on the PDT 1000. Monitored events resulting from software occurrences may be generated by monitoring signals and messages passed throughout the PDT 1000. For example, many software occurrences may be identified by monitoring communication to and from the CPU for 1010. Identification of occurrences may be simplified by using an event driven operating system.

Many current operating systems and applications are event driven meaning that instead of waiting for a complete command which may order it to process information, the system is preprogrammed with an event loop, to look repeatedly for software messages to process (this might be the appearance of a file in a folder, a keyboard or mouse operation, or a timer event) and then perform a trigger function to process it. To distinguish with the use of the term monitored event(s), these software messages will be termed "OS events." An OS event usually indicates something has happened, such as a keystroke or mouse click. Most OS events are the result of occurrences which the monitoring software will find of interest meaning that many of the OS events will result in the creation of a monitored event. It is to be noted that while the present invention may benefit from, it is not limited to use with event driven operation systems.

Physical occurrences relate to external (or internal) forces applied to the PDT, such as pressure, temperature or force. Physical occurrences may be monitored and measured using several methods. Many physical occurrences can be identified by monitoring messages within the PDT 1000—similar to the identification of software occurrences. For example, most event driven OS's will issue an OS event each time a key is pressed or the touch screen touched. Such OS events can be identified as monitored events. However, the most direct method is to provide sensors for each physical occurrence to be monitored.

FIG. 2 illustrates the use of one or more sensors 2004 connected with the auxiliary processor 1024. Such sensors may be added to identify and measure occurrences such as the opening of access panels (e.g. opening of the battery compartment), sound pressure, voltage, acceleration, temperature, moisture, light, location or touch. Taking acceleration as an example, the sensor 2004 would comprise an accelerometer. Monitored events would be created based upon the output, for example using thresholding to identify physical occurrences most likely corresponding to drops or other abuses of the system.

It is to be noted that sensor(s) 2004 may be connected directly to the CPU 1010 with the caveat that unless appropriate interrupt signals can be generated by the sensor(s) 2004, use would be limited to period when the CPU 1010 is awake. As will be appreciated by those of ordinary skill in the art, any number of sensors may be utilized to measure and record any number of desirable occurrences.

Examples of software and physical occurrences that may be used to generate monitored events are set forth in TABLE 1. Many of the examples are applicable to two or more subsystems in a PDT 1000. For example, many of the communication related occurrences are applicable to every communication medium utilized by the PDT 1000, e.g. BLUETOOTH; 802.11; IrdA; USB; CDMA; GSP; etc. . . .

TABLE 1

| Occurrence | Source of data |
| --- | --- |
| temperature (periodic and extremes) | Sensor |
| level of ambient light | Sensor |
| sound pressure levels | Sensor |
| Shocks to system. e.g. unit drops | Sensor |
| Number of times PDT docked | Sensor/OS Events |
| key presses | individually and collectively from OS events |
| battery insertions and removals | Sensor/battery |
| trigger presses | Sensor/OS event |
| AC wall adapter usage | Sensor/OS Event |
| throughput | |
| packets sent/received | |
| dropped packets | |
| erroneous packets | |
| Initiation of communication link | OS Events |
| Time communication link open | Analysis of OS Events |
| touch panel usage | OS Events |
| battery statistics | battery charging mechanism - memory on battery |
| memory usage | |
| Application usage | OS Events |
| number of scans | OS Events |
| successful decodes | OS Events |
| unsuccessful decodes | OS Events |
| LED usage | OS Events |
| Stylus insertion/removal | |
| Microphone usage | OS Events |
| Speaker use | OS Events |
| time to open files and/or applications | |
| system errors | OS Events |
| number of concurrent threads running | |
| CPU time consumed by each active thread | |
| write/read times to memory | |
| time to complete request to OS | |
| time spent waiting for user input | |
| Application runtime duration | Analysis of OS Events |
| number of times an application is launched | OS Events |

TABLE 1-continued

| Occurrence | Source of data |
| --- | --- |
| Entry/Exit of each power save state | OS Events |
| Time spent in each power save state | Analysis of OS Events |
| Time between reboots | OS Events |
| Location | Sensor |
| Speed | Sensor |

Monitored events may be stored in a memory associated with the auxiliary processor 1024 and transferred to the CPU 1010 at convenient times or intervals. For example, such transfers may be initiated on a periodic basis, for example every x days, hours, minutes, seconds or micro seconds. The transfers may also be initiated based upon CPU load. Alternatively, the transfer may take place when the memory available for monitoring data within the auxiliary processor 1024 is nearing zero. In yet another alternative, the transfer may take place based on a message from the CPU 1010.

Figure 3:
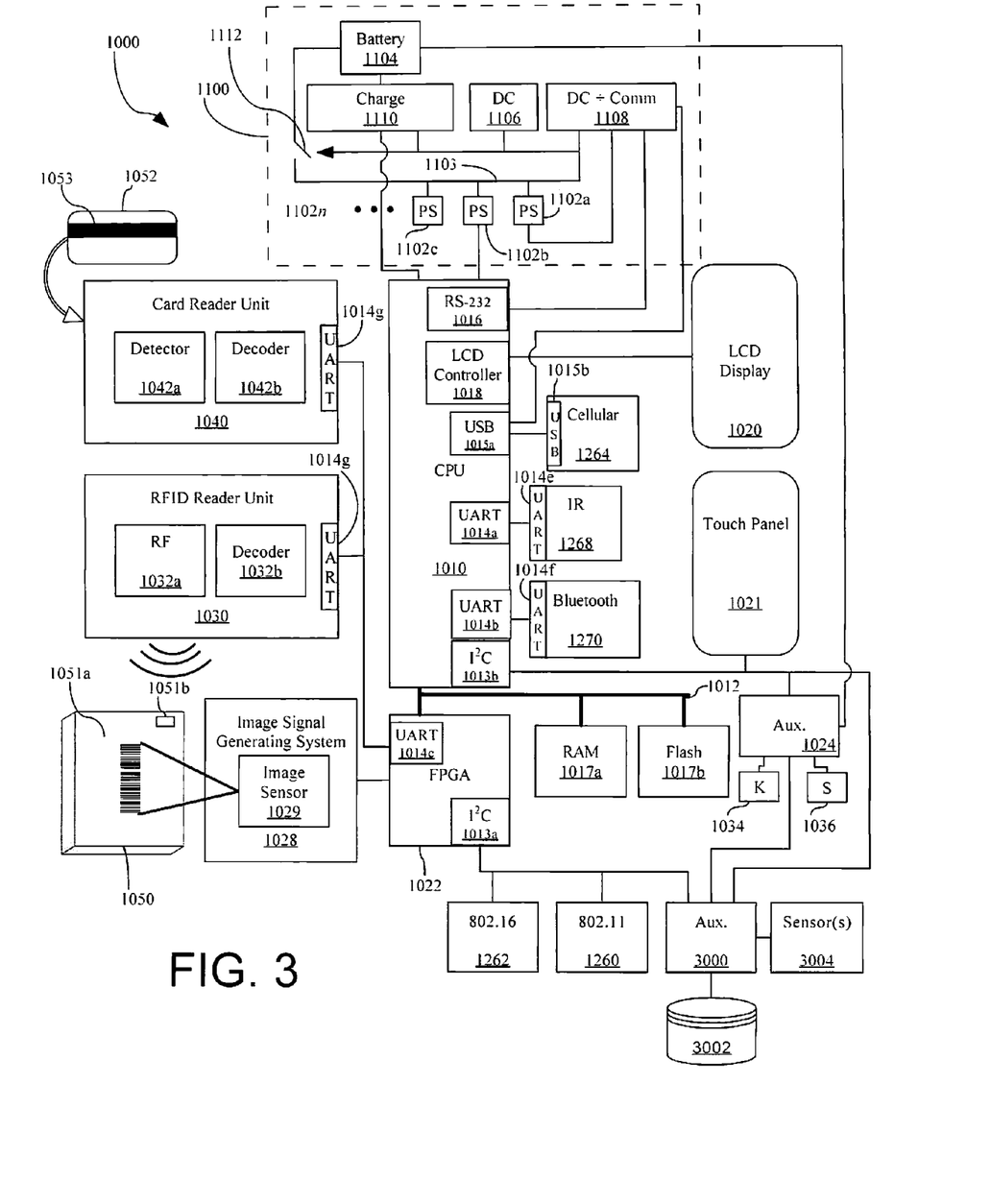
FIG. 3 is a block diagram of a PDT in accordance with an embodiment of the present invention.

FIG. 3 is a block diagram of a PDT 1000 in accordance with an embodiment of the present invention. In the embodiment illustrated in FIG. 3, the PDT 1000 is provided with a second auxiliary processor 3000 (the "processor 3000") capable of receiving signals from the CPU 1010 (via the bus 1013*b*); the FPGA 1022 (via the bus 1013*a*); and the first auxiliary processor 1024.

The processor 3000 may monitor various systems and subsystems within the PDT 1000 and records monitored events related thereto into a database 3002. In particular, the database 3002 maintains a record indicative of occurrences within the PDT 1000. As with the system illustrated in FIG. 2, one or more sensors 3004 may be provided to monitor occurrences outside of those reported by the systems and sub-systems of the PDT 1000. For example, the sensor 3004 may comprise a light, motion, moisture or temperature sensor. This configuration permits the monitoring functions to be executed by a dedicated processor thereby relieving the other processors illustrated in FIG. 2 of the burden. While this may increase the cost of the PDT 1000, it may be appreciated that the responsiveness of the PDT 1000 may be increased. One potential use for this configuration is as a test unit to be placed into service when normally configured PDT, i.e. without a monitoring system, are failing for unexplained reasons. Based on the monitored events recorded in the database 3002 an explanation for the failures may be determined.

Figure 4:
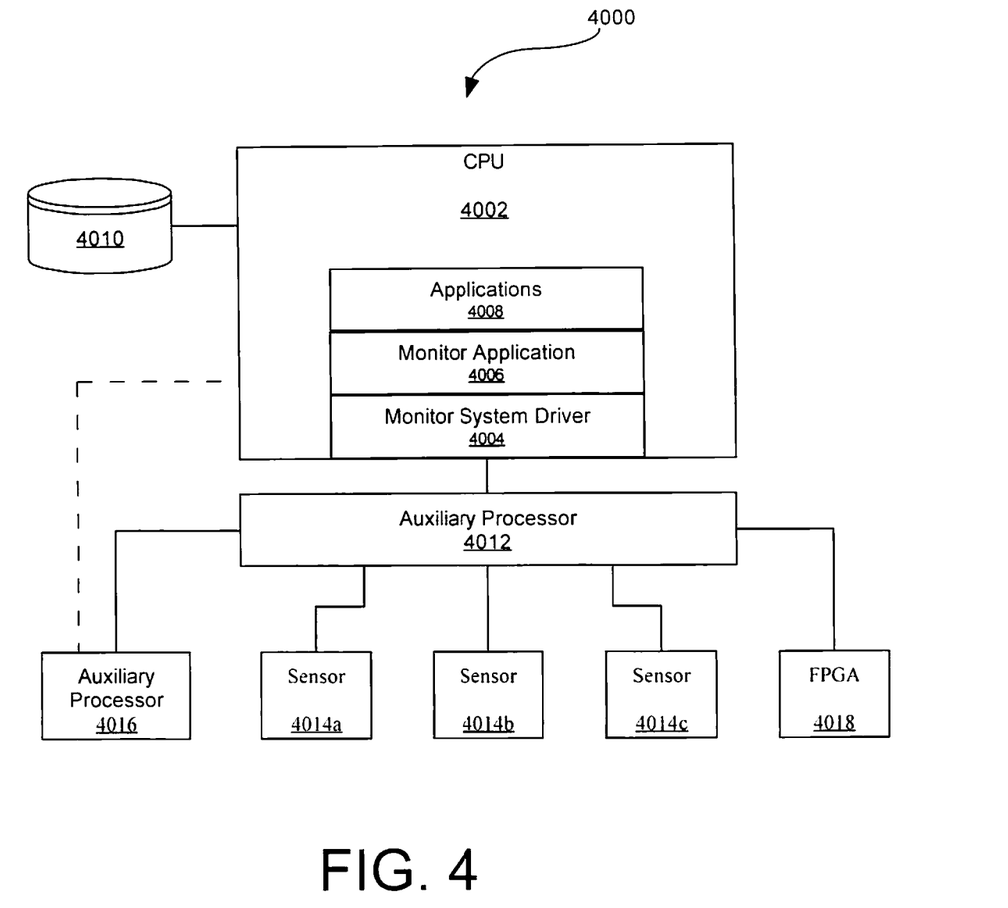
FIG. 4 is a block diagram of a monitoring system for use in a PDT in accordance with an embodiment of the present invention.

FIG. 4 is a block diagram of a monitoring system 4000 for use in a PDT in accordance with an embodiment of the present invention. In particular, FIG. 4 presents a framework for discussion of at least one method that may be utilized to collect and process data generated by the monitoring methods and apparatus discussed hereinabove.

The monitoring system 4000 generally comprises a CPU 4002 connected to a database 4010 and an auxiliary processor 4012. The auxiliary processor 4012 may in-turn be connected to a plurality of sensors 4014*n* and processors, such as a second auxiliary processor 4016 (which in turn may be connected to the CPU 4002), and an FPGA 4018.

During operation, the auxiliary processor 4012 monitors the sensors 4014*n* along with communication to and from the various systems within the PDT, e.g. the Auxiliary processor 4016 and FPGA 4018. The auxiliary processor 4012 identifies occurrences within the systems monitored and generates monitored events reporting such occurrences. It should also be noted that the auxiliary processor 4012 receive events generated by other systems, such as the second auxiliary processor 4016 and the FPGA 4018.

For example, if the sensor 4014*a* comprises a temperature sensor, the auxiliary processor 4012 may generate a monitored event when the measured temperature exceeds a first threshold (in either the hot or cold directions). Additional monitored events may be generated when the measured temperature exceeds additional thresholds or when the rate of change of the measured temperature exceeds a threshold. By way of another example, the sensor 4014*b* may comprise an accelerometer. When the output of the accelerometer indicates that the unit has experienced a drop (or the equivalent thereof), the auxiliary processor 4012 may generate a monitored event. In yet another example, the sensor 4014*c* may comprise a switch that outputs a signal based upon some physical interaction with the PDT, such as the insertion of a cable or the opening of a panel (such as a memory or battery door). Each time the sensor 4014*c* outputs a signal, the auxiliary processor 4012 generates a monitored event describing the occurrence.

The auxiliary processor 4012 maybe provided with a table, or other data structure, correlating sensor output and OS events with monitored events. Such a table would be consulted as each sensor output and OS event is received to determine whether a monitored event is to be issued. The table/data structure maybe dynamic and contain formulas and variables which may be executed and modified throughout the monitoring process. In this manner counters, accumulators, or other functions may be used to trigger the issuance of monitored events.

Monitored events received or generated by the auxiliary processor 4012 are transferred to the CPU 4002. The transfer of events to the CPU 4002 may be scheduled based on a variety of criteria. For example, it may be beneficial to have such transfers to occur as the monitored events are generated when the CPU 4002 is in an awake state. But, when the CPU 4002 is placed into a sleep state, or reduced power mode, it may be beneficial to queue such transfers until the CPU 4002 awakes. Additionally, certain monitored events may be identified as requiring immediate attention for which the CPU 4002 should be woken and a transfer of such events initiated. In yet another embodiment, it may prove beneficial, when queuing monitored events for transfer, to initiate a transfer—including waking the CPU 4002 if necessary—when a certain number of monitored events have been collected or a predetermined amount of time has elapsed.

The CPU 4002 is provided with several layers of programs, including a monitor system driver 4004, a monitor application 4006 and assorted application(s) 4008. The monitor system driver 4004 receives communication, including OS events, from the auxiliary processor 4012 and passes formatted messages to the monitor application 4006. The monitor application 4006 looks at each message and determines a course of action. One possible course of action comprises creation of a monitored event and storing same in the data base 4010. In certain circumstances it may prove beneficial to update an existing monitored event as opposed to the creation of a new entry in the database 4010. Another possible course of action is to pass the message up to one or more applications 4008 for further processing. Yet another course of action is to perform both of the foregoing actions: update the data base 4010 and pass the message to an application 4008.

The database 4010 may be based on any number of available commercial programs, including for example CODE-BASE available from Sequiter Software Inc. There are a variety of ways to create and store monitored events. A simple method is to simply store the data from a sensor, the OS event, or other message as-is. Alternatively, the monitor application 4006 can generate a formatted record with fields identifying a date, time, and location for the occurrence along with an ID of the occurrence and a value associated with the occurrence. The location can be determined from a GPS device, input by a user, or using any of the available location determination algorithms—including those associated with wireless communication systems such as GSM. A portions of such a table could be organized as illustrated in TABLE 2:

TABLE 2

| Date | Location | Time | ID | Value |
|---|---|---|---|---|
| Nov. 1, 2006 | 35.1118, −80.7622 | 05:30:27 | 276 | 234a |
| Nov. 1, 2006 | 35.1896, −80.6761 | 15:23:12 | 003 | 2 |

Alternatively (or additionally), the database 4010 can store statistics associated with the frequency of particular events. Such a table would record the number of times a particular event occurred over a period of time. A portion of such a table is illustrated in TABLE 3:

TABLE 3

| Period | Occurrence | Times Occured |
|---|---|---|
| 1 | 1024 | 1 |
| 1 | 1025 | 15 |

Another possibility, either by itself or cumulatively with any of the options discussed above, is to record monitored events based on thresholds, for example when a particular key has been pressed 500 times or the unit has been dropped five times. The thresholds may be selected based on past experience to be highly indicative of system health and impending problems. This approach reduces the space occupied by the data base while recording occurrences that have been identified as having a direct relationship to the health of the system.

Yet another possibility is to record changes ("deltas") in monitored values such as temperature, dropped packets, transmitted packets, key presses, etc. . . . In many cases, the size of data representing deltas is significantly smaller than the raw data. This may reduce the overhead placed on the PDT with respect to CPU time and bandwidth.

Figure 5:
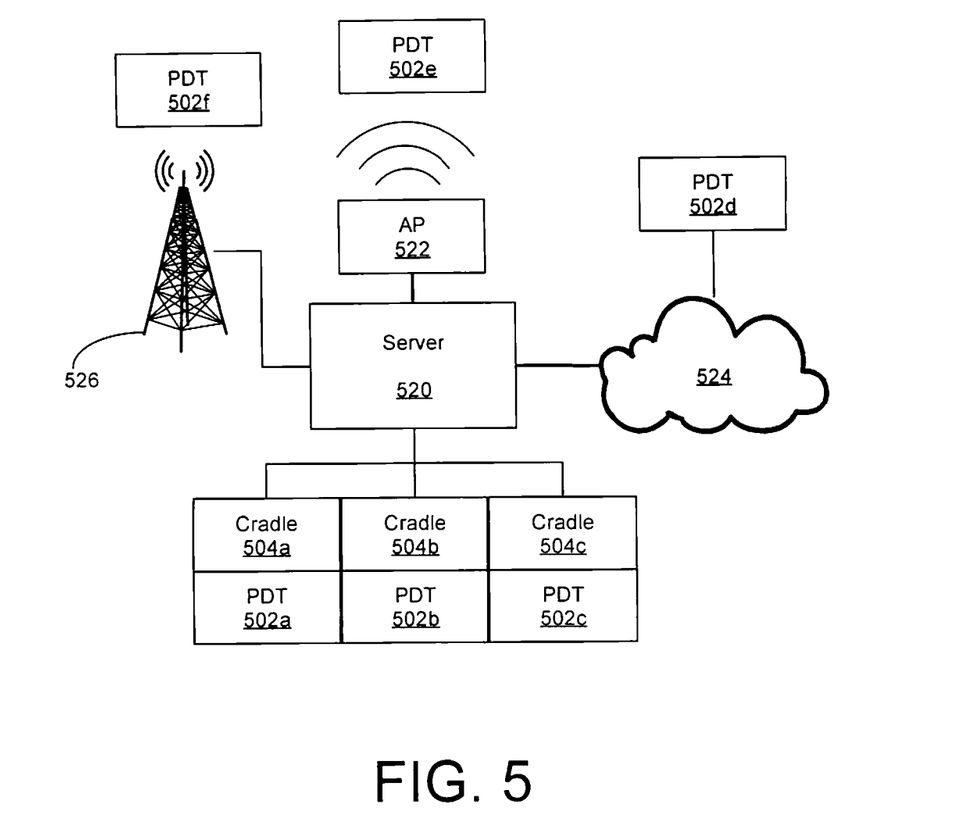
FIG. 5 is a diagram of a system of PDTs having elements of preferred embodiments of the present invention.

FIG. 5 is a diagram of a system of PDTs having elements of preferred embodiments of the present invention. In particular, FIG. 5 illustrates a plurality of PDTs 502n that report to a server 520 via a plurality of communication mediums. The PDTs 502a, 502b, and 502c are connected to the server 520 via cradles 504n (also referred to as base stations). PDT 502d is connected through an internet connection 524, using for example a USB network adapter. PDT 502e is connected using an 802.11 Access Point 522. Finally, PDT 502f is connected to a wireless base station 526 (for example a GSM base station).

At least one PDT 502n contains a monitoring system 400. In perhaps a preferred embodiment, each of the PDTs 502n contains a monitoring system 400. However, it is to be recognized that the overhead added by the monitoring system 400 may unacceptably reduce the responsiveness of the PDT into which the system has been installed. In such cases, it may prove useful to install the monitoring system 400 in a few units for service in locations that have experienced unusual failures.

Each PDT 502n equipped with a monitoring system 400 is responsible for providing the server 520 with the contents of their individual databases 4010 (see FIG. 4). The server 520 may include data analysis software that analyzes the data received from each of the PDTs 502n, either on an individual basis or on a collective basis, to determine performance, identify trends and, if desired, apply predictive analysis in an attempt to proactively identify potential faults within the PDTs 502n. A wide variety of techniques may be employed for fault prediction, including numerous artificial intelligence techniques such as predictive analysis and model based diagnostics. Such systems may benefit from the use of neural networks and fuzzy logic techniques.

The scheduling of transfers between the PDTs 502n and the Server 520 may be based on a variety of factors, including the amount of data to be transferred, an available transfer medium, the bandwidth of the available transfer medium, and the available bandwidth of the available transfer medium. The system may be programmed to seek a transfer on a periodical basis, such as on the hour or once a day. Transfers may be initiated by either the PDT 502n or the server 520.

Although some embodiments of the present invention have been shown and described, it will be appreciated by those skilled in the art that changes may be made in these embodiments without departing from the principles and spirit of the invention, the scope of which is defined in the claims and their equivalents. For example, some sub-systems may need to be supplied power while in sleep mode that normally would not receive power in sleep mode. One example is the keyboard 1262, where it may be desirable to record all key presses—regardless of the sleep state or the effectiveness of such key press. Another example is the touch panel 1021 where it may be desirable to record all touches—regardless of the sleep state or the effectiveness of such touch.

Figure 6:
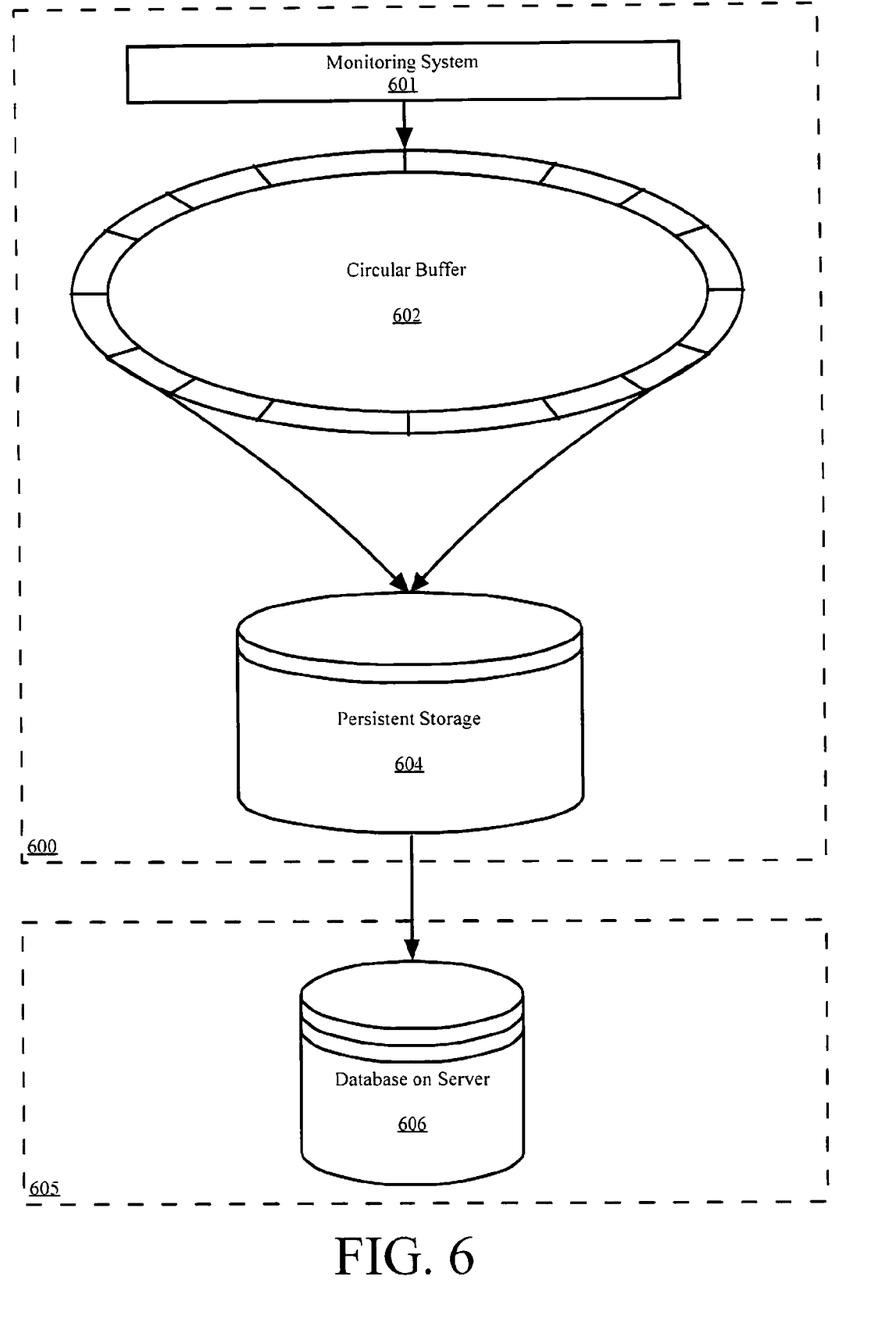
FIG. 6 is a diagram useful for explaining a further embodiment of the present invention.

FIG. 6 is a diagram useful for explaining an additional embodiment of the present invention. In particular, FIG. 6 illustrates a PDT 600 including a monitoring system 601, and a circular buffer 602 formed within a persistent storage 604. Generally, the buffer 602 is used to store the most recent output of the monitoring system 601. In the event of a failure of the PDT 600, the data on persistent storage 604 should contain a snapshot of the state of the PDT 600 prior to, and possible after, the failure. By being able to review a snapshot of the state of various elements of the PDT 600, a technician should gain insight into the events that lead to the failure and may be able to recreate the failure by reconfiguring a PDT to mimic the state thereof prior to the failure.

The monitoring system 601 may comprise any of the monitoring systems described herein including the configurations discussed with respect to FIG. 2 and FIG. 3. It is envisioned that the most useful configuration of the embodiment would only transfer a subset of the data collected by the monitoring system on the PDT 601. For example, useful data may include: battery charge level; free memory; radio configuration data; the headers of sent and received packets; contents of radio buffers; and a last user action such as button pushed, application executed, etc. . . . The selection of data to be stored in accordance with the present embodiment may also be based on user interaction, for example by selecting items from a check list.

The buffer 602 generally comprises a buffer of predetermined (but potentially dynamic) size along with a write pointer and a read pointer respectively indicating where the next data will be written and read. While the term "circular" is figurative, it alludes to the rotation through the buffer 602 of the positions of the pointers. When moving through the buffer 602, the write pointer moves forward one step each time a write is executed. When the write pointer passes the end of the buffer 602 the bugger 602 is full and the write pointer is reset to the beginning of the buffer. Any new writes will over write the oldest data. In this manner the buffer 602 maintains the most recent (as defined by a user or administrator) output of the monitoring system 601.

Persistent storage 604 may comprise any form of storage that does not need a power supply to maintain the contents thereof, e.g. IPSM (typically on an integrated flash memory such as flash 1017b), SD card etc. . . . The persistent storage 604 may be embodied by existing memory elements in the PDT 600, such as flash 1017b in FIG. 2 or may be embodied by an added dedicated memory element as depicted by storage 3002 in FIG. 3. It may also prove preferable to use a removable storage medium so that data stored therein may be easily retrieved even in the event of a critical system failure.

In operation, the monitored events, or a sub-set thereof, generated by the monitoring system 601 are copied into the buffer 602 creating a snap shot of the data produced by the monitoring system. The size of the snap shot is determined by the size of the buffer 602 which may either be fixed or dynamic. For example, a user may set the size by selecting an amount of memory to dedicate to the buffer, selecting a time for which entries should be maintained, or number of entries to be stored.

While it may prove both beneficial and feasible to operate the buffer 602 all the time while the PDT 600 is operational, it may also prove useful to limit the filling of the buffer 602 to certain time periods. Initiation and cessation of data entry from the monitoring system 601 to the buffer 602 may be triggered by a variety of events, including the passage of a predetermined amount of time, the detection of some predefined occurrence (such as OS or monitored events), a series of occurrences, or some other predefined condition. One potentially useful configuration is to identify conditions and events that precede system failures and utilizes those to define the trigger.

The data within the persistent storage 604 will eventually be transferred to an external database 606 on a computer 605. The transfer may be triggered based upon a variety of conditions. In one embodiment, the transfer would take place after a failure of the PDT 600. In general, this may be easily accomplished where the persistent storage 604 is embodied by a removal flash card, such as an SD card. Where the memory is more integrated with the PDT 601, e.g. an IPSM region on flash memory, such transfer may require technical services—however as the PDT 600 has failed such service may be required anyway.

In one possible alternative configuration of the present embodiment, the circular buffer 602 may be formed in a different memory structure other than the persistent storage 604 with the data in the buffer 602 being periodically copied to the persistent storage 604. This configuration may prove beneficial when the memory structure used to store the buffer 602 has faster write times than the persistent storage 604. The action of copying the buffer 602 to the persistent storage 604 may be triggered by a clock or some other signal or event. The data copied to the persistent storage 604 may either overwrite the existing data therein or be added thereto. It is also possible to set up another circular buffer in which the newest data overwrites the oldest data in the event that available space is limited.

It may also prove useful to protect the content the buffer 602 from being overwritten based on an identified trigger. Assume that the monitoring system 601 is writing data to the buffer 602; upon the occurrence of a pre-defined event, all or a portion of the current contents, for example the data written in the previous 10 seconds, may be protected from being overwritten. Once a trigger even is detected and a portion of the buffer 602 protected, the remaining space in the buffer 602 may either be configured as another circular buffer or, more simply, writing to the buffer 602 would be stopped upon circling back around to the protected area—in effect protecting the data post trigger to the extent of available buffer space. Possible triggers include running out of memory or a lock-up of the OS. A locked-up OS may be identified using a variety of mechanisms, including spawning a counter and monitoring the counter with an auxiliary processor. When the counter freezes for a predetermined amount of time, the OS may be declared locked.

In the event that the persistent storage 604 is configured as a removable medium, it may prove useful to provide an application on the persistent storage 604 that initiates the monitoring system 601 upon insertion of the persistent storage 604 into the PDT 600. It may also prove useful to store all or a portion of the software forming the monitoring system 601 on the persistent storage 604 which would be transferred and executed upon insertion of the persistent storage 604 into a PDT 600. Thus, in use, by simply inserting the persistent storage 604 into a PDT 600, that PDT 600 would be configured to monitor in accordance with the previously described embodiments. Upon removal of the persistent storage 604, the monitoring activities would cease.

In yet another embodiment not necessarily related to the embodiment illustrated in FIG. 6, a series of tests are periodically conducted on a PDT and the results of the test, for example comprising monitored events, are collected and stored in memory. Over time a devices performance can degrade because of a variety of reasons. Component age, cleanliness or distress from a harsh physical environment can cause the performance of the imager, battery or radio to degrade. This degradation can lead to a slow down in the PDT's overall performance. The results of the series of tests may be used to derive an indication of the health of the PDT. By tracking a PDT's response to the tests, a system administrator would be able to spot devices on decline and replace them before they have an impact on a user's productivity. The health history can be charted in a graphical manner to facilitate the identification of weak devices.

The tests are configured to execute when the PDT is inserted into a cradle or base station, e.g. cradles 504n in FIG. 5. In general, a PDT is inserted into a cradle or base station to recharge and perhaps perform a data transfer. Outside of the data transfers and charging, most of the system components are idle during this time. During this time, diagnostic tests may be run on the components of the device without impacting a user. Suitable diagnostic tests are available and known to those of ordinary skill in the art. However, the monitoring system described herein makes the creation of custom tests a fairly straight forward process.

In their simplest form, most tests comprise the application of an input, such as directions and/or data, to the system, or sub-system, under test and the collection of data regarding the reaction of the system to the input. Post analysis of the data is provided by many test applications, but such analysis need not be performed on the PDT nor in conjunction with the actual test.

As the monitoring system automates the collection of data, a test can be created by defining the input. In general, the input can be encapsulated within an application. A remote application or the PDT's own operating system may be used to initiate a diagnostic test application. Such initiation may include the generation of a monitored event so as to identify the opening of the test window during which monitored events are to be collected. Similarly, as the test application closes, it may cause the issuance of a monitored event to signal the end of the test window.

During the test window monitored events may be copied to a specified memory location. Of course, not all monitored events need be collected—a sub-set of relevant monitored events may be defined. It should also be noted that the test application may output data relevant to the test that may also be captured in addition to the monitored events. Alternatively, the test application can be modified to output monitored events directly or some other message, e.g. OS events, that will be picked up as monitored events by the monitor application 4006.

As each test is completed and the monitored events collected, they may be passed over a communication channel. The communication channel preferably, but not necessarily, comprises the channel associated with the cradle or base. Analysis of the collected data can be performed by the receiving computer or any other suitable device to which the data is transferred.

A useful modification to any of the embodiments disclosed herein would be to trigger operation of the monitoring system based on a signal from an external system. Many companies use management software to control the contents on a fleet of PDTs, e.g. EPM from IPASS. Such systems send out periodic update messages with instructions and data for updating the contents of their associated PDTs. Activation and deactivation messages could easily be included with the communication between the management system and the PDTs. Many monitoring systems also facilitate targeted messaging to a sub-set of all associated PDTs. This would allow the activation of monitoring systems on select devices.

What is claimed is:

1. A portable data terminal system comprising:
   a portable data terminal, the portable data terminal comprising:
      a housing;
      a data collection device supported by the housing for reading at least one selected from a list comprising: bar codes, RF encoded data from a passive RFID tag, and data from a card;
      a keypad supported by the housing;
      a touch screen supported by the housing; and
      a monitoring system, the monitoring system comprising:
         at least one auxiliary processor in communication with at least one sensor of the portable data terminal; and
         monitoring software that monitors, using the at least one auxiliary processor, occurrences experienced by the portable data terminal, and records occurrence data that is data other than data collected by the data collection device and that describes the monitored occurrences experienced by the portable data terminal, the monitored occurrences comprising software occurrences and physical occurrences, wherein the software occurrences comprise software messages comprising operating system (OS) events, and wherein the physical occurrences comprise external or internal forces applied to the portable data terminal and monitored by the at least one sensor of the portable data terminal, the monitored occurrences include the following: moisture, level of ambient light, touch screen usage, battery usage, number of scans, number of times docked, key presses, and trigger usage.

2. A portable data terminal system as set forth in claim 1, wherein the monitoring system summarizes the occurrences.

3. A portable data terminal system as set forth in claim 1, wherein the occurrence data comprises a list of events generated by a component of the portable data terminal based upon the occurrences.

4. A portable data terminal system as set forth in claim 3, wherein the monitoring software is executed by a main processor which is other than the at least one auxiliary processor.

5. A portable data terminal system as set forth in claim 1, wherein the occurrence data comprises a list of occurrences that have associated values that exceed user defined threshold for that occurrence.

6. A portable data terminal system as set forth in claim 1, wherein the occurrence data comprises a list of changes over time in values associated with occurrences.

7. A portable data terminal system as set forth in claim 1, wherein the portable data terminal further comprises:
   a main processor that operates in accordance with the operating system; and
   wherein the at least one auxiliary processor controls predefined functions within the portable data terminal.

8. A portable data terminal system as set forth in claim 7, wherein the monitoring system is executed by one or more auxiliary processors of the at least one auxiliary processor.

9. A portable data terminal system as set forth in claim 1, wherein the monitoring system records the occurrence data into a circular buffer.

10. A portable data terminal system as set forth in claim 1, further comprising:
    a cradle that receives the housing and provides connectivity to a network;
    software that initiates diagnostic test procedures run on components of the portable data terminal and used to derive an indication of the health of the portable data terminal when the housing is seated within the cradle;
    wherein the monitoring software identifies occurrences associated with the test procedures.

11. A portable data terminal system as set forth in claim 1, wherein the portable data terminal system further comprises a computer, and wherein the monitoring system transfers occurrence data based on connectivity between the computer and the portable data terminal.

12. A portable data terminal system as set forth in claim 11, wherein the monitoring system transfers the occurrence data based on a time elapsed since last transfer.

13. A portable data terminal system as set forth in claim 12, wherein the monitoring system transfers occurrence data based upon a request from the computer.

14. A portable data terminal system as set forth in claim 11, wherein the computer analyzes occurrence data transferred from the portable data terminal to identify trends.

15. A portable data terminal system as set forth in claim 11, wherein the computer analyzes occurrence data transferred from the portable data terminal to identify the potential of a failure within the portable data terminal.

16. A portable data terminal system as set forth in claim 15, wherein the computer issues alerts based on identified potential failures.

17. A portable data terminal system as set forth in claim 16, wherein the alerts comprise at least one of an e-mail, a page, a fax, a message posted to a web site, and an automated telephone call.

18. A portable data terminal system as set forth in claim 1, wherein the portable data terminal system comprises a plurality of portable data terminals.

19. A portable data terminal system as set forth in claim 1, wherein the monitoring software is stored on a removable storage device that is executed upon insertion of the removable storage device into the housing.

20. A portable data terminal system comprising:
- a portable data terminal comprising:
  - a hand held housing;
  - a data collection device supported by the housing for reading at least one selected from a list comprising: bar codes, RF encoded data from a passive RFID tag, and data from a card;
  - a keypad supported by the housing; and
  - a touch screen supported by the housing;
- a cradle for receiving the portable data terminal; and
- a testing system that initiates diagnostic tests on the portable data terminal when the portable terminal is seated in the cradle, wherein the tests comprise application of test data input to the portable data terminal or sub-system thereof, and collection of result data regarding reaction of the portable data terminal or sub-system thereof to the input test data to derive an indication of the health of the portable data terminal;
- wherein the testing system records occurrence data that is data other than data collected by the data collection device, the occurrence data monitored using at least one auxiliary processor of the portable data terminal, and the occurrence data describing monitored occurrences experienced by the portable data terminal, the monitored occurrences comprising software occurrences and physical occurrences, wherein the software occurrences comprise software messages comprising operating system (OS) events, and wherein the physical occurrences comprise external or internal forces applied to the portable data terminal and monitored by at least one sensor of the portable data terminal, the monitored occurrences include the following: moisture, level of ambient light, touch screen usage, battery usage, number of scans, number of times docked, key presses, and trigger usage.

* * * * *